March 26, 1968 R. H. HAYNES 3,374,819
TIRE REMOVAL TOOL
Filed Sept. 10, 1965 2 Sheets-Sheet 1

INVENTOR.
RICHARD R. HAYNES
BY *James J. Cannon*
atty.

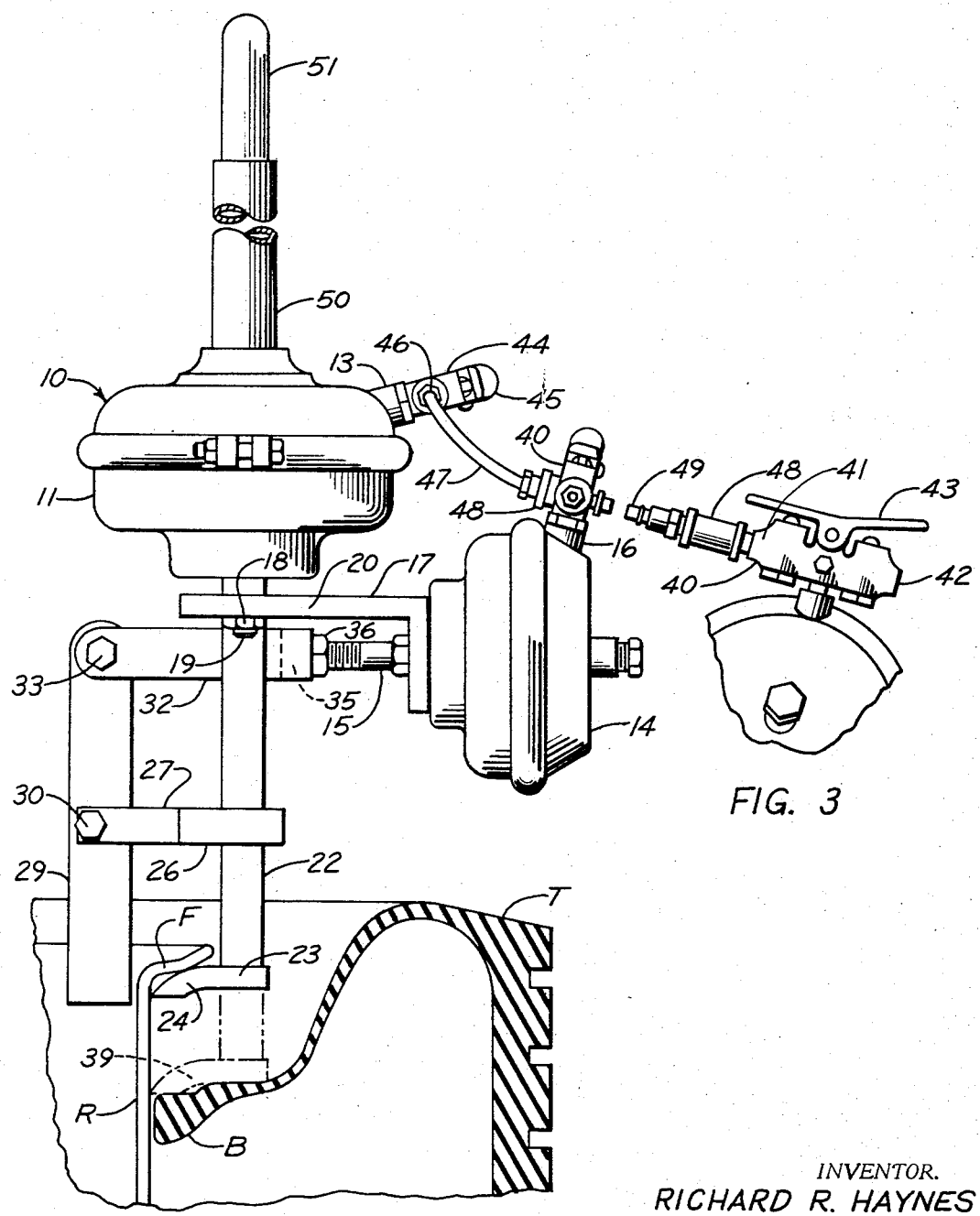

United States Patent Office 3,374,819
Patented Mar. 26, 1968

---

3,374,819
TIRE REMOVAL TOOL
Richard H. Haynes, 144 Fulton St.,
New Milford, N.J. 07646
Filed Sept. 10, 1965, Ser. No. 486,324
2 Claims. (Cl. 157—1.17)

ABSTRACT OF THE DISCLOSURE

A tire removal tool having a first pneumatic means and a second pneumatic means mounted at right angles to each other on a common right angle bracket means and gripping means operated by the first pneumatic means to grip the opposite sides of the wall of a wheel rim and jacking means operated by the second pneumatic means to separate a tire bead from a wheel rim.

---

This invention relates to tire repair tools and is directed particularly to a pneumatically-operated tool for removing pneumatic tires from tire rims.

The principal object of the invention is to provide a tire tool of the character described that is especially well suited as an aid in removing truck or construction equipment tires in the field, i.e., on the spot, where the heavier mechanical devices of a repair shop are usually not available.

A more particular object of the invention is to provide a pneumatically actuated tool for separating the bead from the rim of a tire to be removed for repair, the tool having individually powered clamping and jacking mechanisms for clamping a tool jack between the tire bead and the rim flange of a wheel, and then separating the bead from the rim flange, to permit easy removal of the tire from the rim with ordinary hand tools.

Still another object of the invention is to provide a tire removal tool of the character described which will be light in weight, compact, easy to operate and durable in use.

Other objects, features and advantages of the invention will be apparent from the following description when read with reference to the accompanying drawings. In the drawings, wherein like reference numerals denote corresponding parts throughout the several views:

FIG. 2 is a side elevational view of the tool as seen in FIG. 1;

FIG. 3 is a fragmentary view illustrating in front elevation details of the air inlet and air control valve mechanism.

Figures 1, 4:
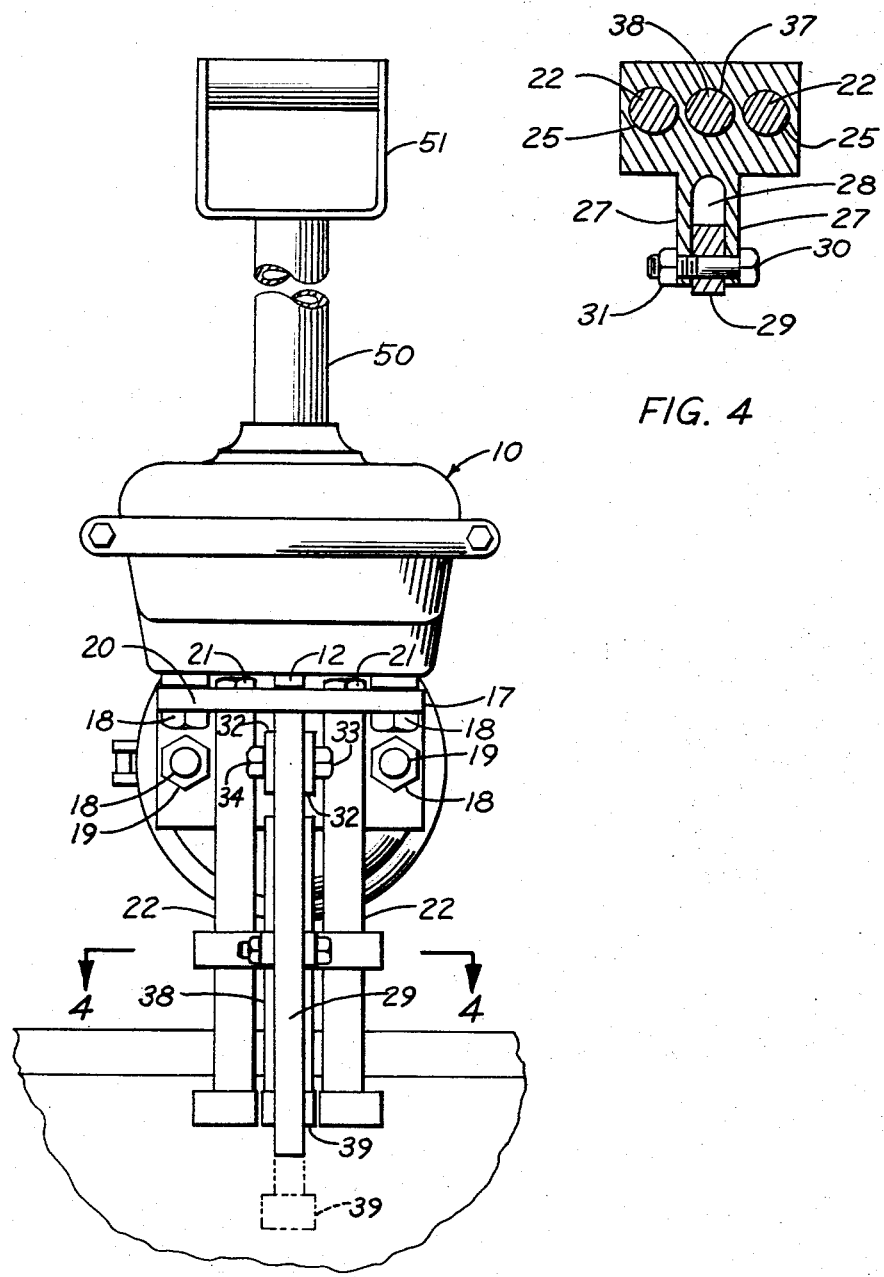
FIG. 1 is a rear elevational view of the tire tool shown in use in separating a tire bead from the flange of its rim.
FIG. 4 is a horizontal cross-sectional view taken along the line 4—4 of FIG. 1 in the direction of the arrows.

Referring now in detail to the drawings, numeral 10 in FIGS. 1 and 2 designates, generally, a tire tool embodying the invention shown in use in separating the bead B of a tire T from the flange F of a tire wheel rim R. The tool 10 comprises a jacking pneumatic cylinder 11 having a piston rod 12 and on air inlet orifice 13, and a clamping pneumatic cylinder 14 having a piston rod 15 and an air inlet orifice 16, said pneumatic cylinders being affixed in mutually perpendicular relation so that said piston rods extend towards each other, by means of a right angular bracket 17 secured by nuts 18 threaded upon stud bolts 19 extending outwardly from the front ends of said cylinders. It will be understood that when air pressure is applied to the air inlet orifices of the pneumatic cylinders 11 and 14 the respective piston rods 12 and 15 will move and press outwardly with substantial force, imparting motion to the mechanisms hereinafter described. The pneumatic cylinders, being of commonly known construction and operation, are deemed not to require more detailed description herein.

Means is provided for clamping the tire tool against the flange portion of a tire rim with a foot portion of the tool between the bead of a tire mounted on the rim and the inside wall of a flange of the rim. To this end, there is secured to the side portion 20 of the bracket 17, as by nuts 21, and extending outwardly therefrom in spaced parallel relation to the piston rod 12 of the jacking pneumatic cylinder 11, and in a common plane coaxial therewith, a pair of coextensive cylindrical rods 22, the outer ends of which have welded thereon forwardly-extending rectangular feet 23. The front ends of the feet 23 are slightly downwardly curved, as indicated at 24. The rods 22 extend through circular bores 25 in a guide block 26 positioned centrally along said rods. The guide block is integrally formed with a pair of spaced, parallel, forwardly-extending arm portions 27 defining a recess 28 received within which is a clamping bar 29. The clamping bar 29 is pivotally linked to the arm portions 27 at a central position therealong by a bolt 30 and nut 31 extending through aligned openings in said arm portions and clamping bar. The lower end of the clamping bar 29 extends slightly beyond the lower ends of the feet 23 at the ends of the cylindrical rods 22. The upper end of the clamping bar 29 is pivotally connected to a pair of flat, spaced, parallel link bars 32, one at each side thereof, as by a bolt 33 and nut 34 extending through aligned openings in said clamping bar and said link bar. The link bars 32 extend inwardly and are joined at their inner ends by an interconnecting block 35 welded in place, the outer surface of which has welded thereupon a nut 36 threadingly received within which is the threaded outer end of the piston rod 15 of the clamping pneumatic cylinder 14.

Slidingly arranged in a central bore 37 in the guide block 26 is a jacking rod 38 the lower end of which is provided with a spreader foot 39 identical with the feet 23 at the lower ends of the cylindrical side rods 22, and the upper end of which is provided with a threaded opening threadingly received within which is the outer end of the piston rod 12 associated with the jacking pneumatic cylinder 11.

Valve means is provided for independently supplying and releasing air under pressure to the jacking and clamping pneumatic cylinders 11 and 14 for independently controlling their clamping and jacking action with respect to a tire rim, as is hereinbelow more fully described. To this end, the air inlet orifice 16 of the clamping pneumatic cylinder 14 is fitted with a manually operated combination inlet and relief valve 40 having an inlet orifice 41 and an outlet or relief orifice 42. The valve 40 has a rockable handle 43, which, when pushed in one direction opens the air inlet valve to supply air to the clamping pneumatic cylinder 14, and when pushed in the other direction releases air from the cylinder to the atmosphere. The air inlet orifice 13 of the jacking pneumatic cylinder 11 is fitted with an equivalent inlet and relief valve 44 having a rockable control handle 45. The air inlet orifice 46 of the valve 44 is joined by an air conduit or hose 47 to the central branch of a T-fitting 48 one side of which is connected to the air inlet orifice 41 of the valve 40 associated with the clamping pneumatic cylinder 14, and the other side of which has fitted therein a nipple 49 for the application of air under pressure from an air compressor hose.

To facilitate handling and use of the tool, an axial shaft 50 is secured at one end, as by welding, against the outer end of the jacking pneumatic cylinder 11, in coaxial relation with respect to the piston rod 12 thereof, said shaft having a hand grip 51 secured at its outer end.

In use, the feet 23 at the outer ends of the rods 22, together with the spreader foot 39 in transverse alignment therewith, will be placed between the tire bead B and the inside of the flange F of the tire rim R, as illustrated by the full line representation of said feet in FIGS. 1 and 2, after which the handle 43 of the valve 40 associated with the clamping pneumatic cylinder 14 will be rocked to the left (as seen in FIG. 3) to apply air pressure supplied to the air inlet nipple 49 to said clamping pneumatic cylinder. The associated piston rod 15 will thereupon move outwardly to rock the clamping bar 29 about its fulcrum bolt 30 so that the lower end of said clamping bar will move forcefully in the direction of the feet 23, 39. Such action forces the forward ends of the feet to move inwardly to the face of the rim flange F, and to be clamped thereat by the force being exerted upon the outside of the rim by the clamping bar 29. The operator will then actuate the rockable control handle 45 associated with the jacking pneumatic cylinder 11 to admit air to said cylinder, whereupon the associated piston rod 12 will be pushed outwardly forcefully to carry with it the jacking rod 38 with its spreader foot 39. As illustrated by the broken line representation thereof in FIG. 1, the spreader foot will be moved outwardly forcefully, to loosen and spread the tire bead B away from the rim flange F. This having been accomplished, the valve handles 43 and 45 will be pushed in their opposite direction to discharge air from the pneumatic cylinders, thereby effecting release of the tool so that it can be moved to other positions along the tire rim to completely loosen the tire, after which it can be removed in the usual manner with ordinary hand tools.

While there is illustrated and described herein only one form in which the invention can conveniently be embodied in practice, it is to be understood that this form is presented by way of example only, and not in a limiting sense. The invention, in brief, comprises all the embodiments and modifications coming within the scope and spirit of the following claims.

What I claim as new and desire to secure by Letters Patent is:

1. In a pneumatically actuated tool for separating a tire bead from a wheel rim, the combination comprising, a first pneumatic cylinder having an outwardly-projecting, axially-extensible first piston rod, a second pneumatic cylinder having an outwardly-projecting, axially-extensible second piston rod, bracket means fixedly interjoining said pneumatic cylinders so that their piston rods are directed in substantially mutually right-angular relative disposition, guide block means including a plurality of substantially parallel bores therethrough, a pair of elongated, coextensive rod members in said bores, said rod members being fixed with respect to said first pneumatic cylinder and extending outwardly thereof in spaced parallel disposition with respect to said first piston rod, a pair of laterally-extending foot members fixed one each to the outer ends of said rod members, a jacking rod attached at one end to said first piston rod and slidably extending through a bore in said block means between said rod members and being in coaxial alignment with said first piston rod, said jacking rod having at its other end a third foot member disposed between said pair of foot members, a clamping bar, arm means secured to said guide block means for pivotally supporting said clamping bar about a central point of said clamping bar in substantially spaced parallel relation with respect to said jacking rod and in a common plane therewith substantially perpendicular with the common plane of said pair of rod members, said clamping bar including means for pivotal attachment to said second piston rod, and selective energizing means to actuate the movement of said second piston rod for swinging said clamping bar so that its outer end moves laterally towards said foot members to forcefully engage the opposite juxtaposed sides of a wall of a wheel rim, and selectively energizing means to actuate said first piston rod and said jacking rod to separate a tire bead from a wheel rim.

2. A pneumatically actuated tool for separating a tire bead from a wheel rim as defined in claim 1 including a handle affixed to said first pneumatic cylinder and extending outwardly thereof opposite said first piston rod, for facilitating the handling and use of the tool.

References Cited

UNITED STATES PATENTS

| | | | |
|---|---|---|---|
| 1,519,558 | 12/1924 | Snider | 157—1.17 |
| 2,538,962 | 1/1951 | Branick | 157—1.17 |
| 2,679,896 | 6/1954 | Branick | 157—1.17 |
| 2,801,684 | 8/1957 | Salsbury | 157—1.17 |
| 2,822,863 | 2/1958 | Regnault | 157—1.17 |

WILLIAM W. DYER, Jr., *Primary Examiner.*

GRANVILLE Y. CUSTER, Jr., *Examiner.*